Dec. 18, 1928.                                            1,695,320
                        W. H. CARRIER
         STUFFING BOX OR SEALING MEANS FOR COMPRESSORS AND THE LIKE
                Original Filed April 5, 1921    3 Sheets-Sheet 1
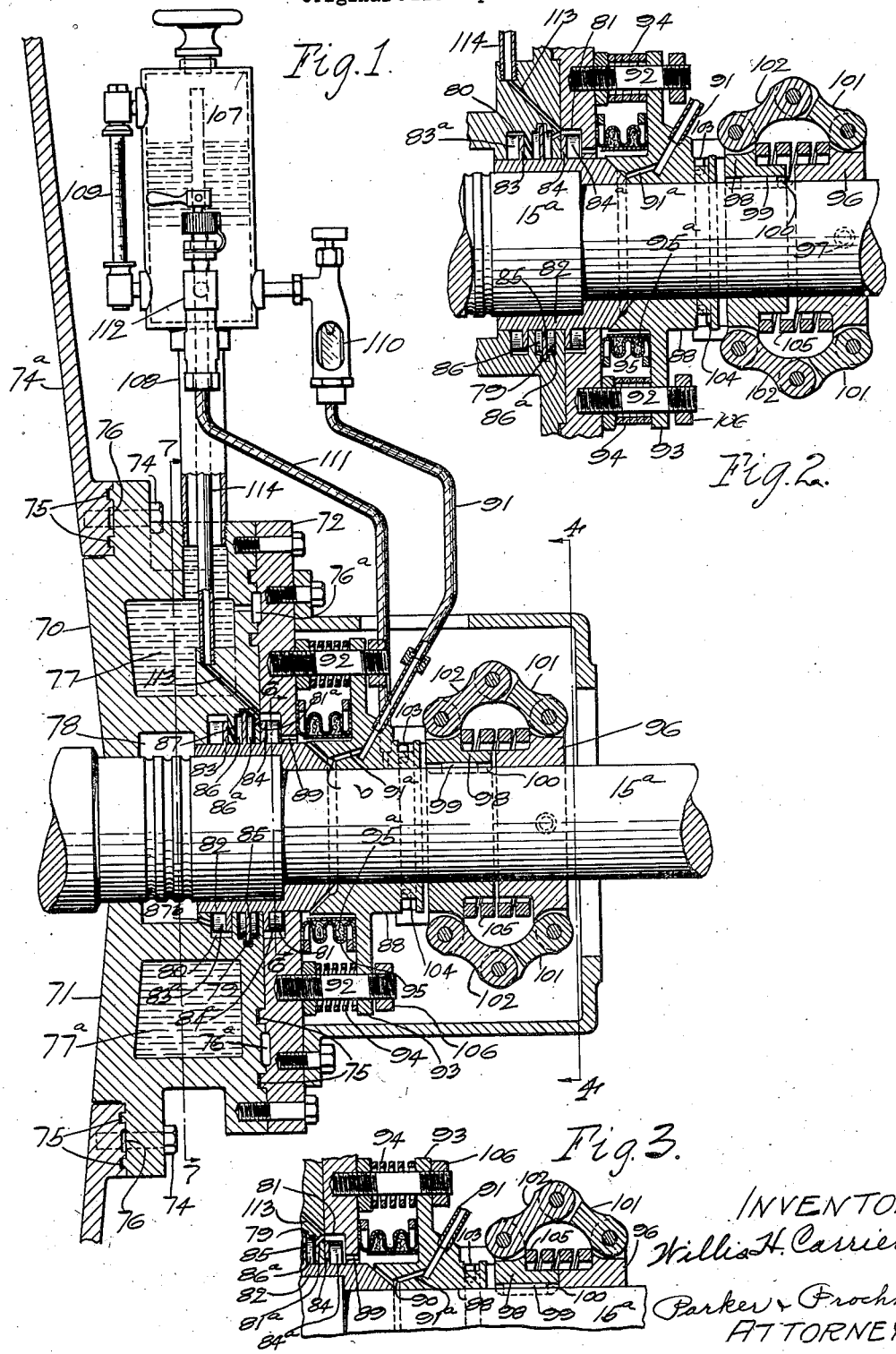
INVENTOR
William H. Carrier,
Parker & Frochnou
ATTORNEYS

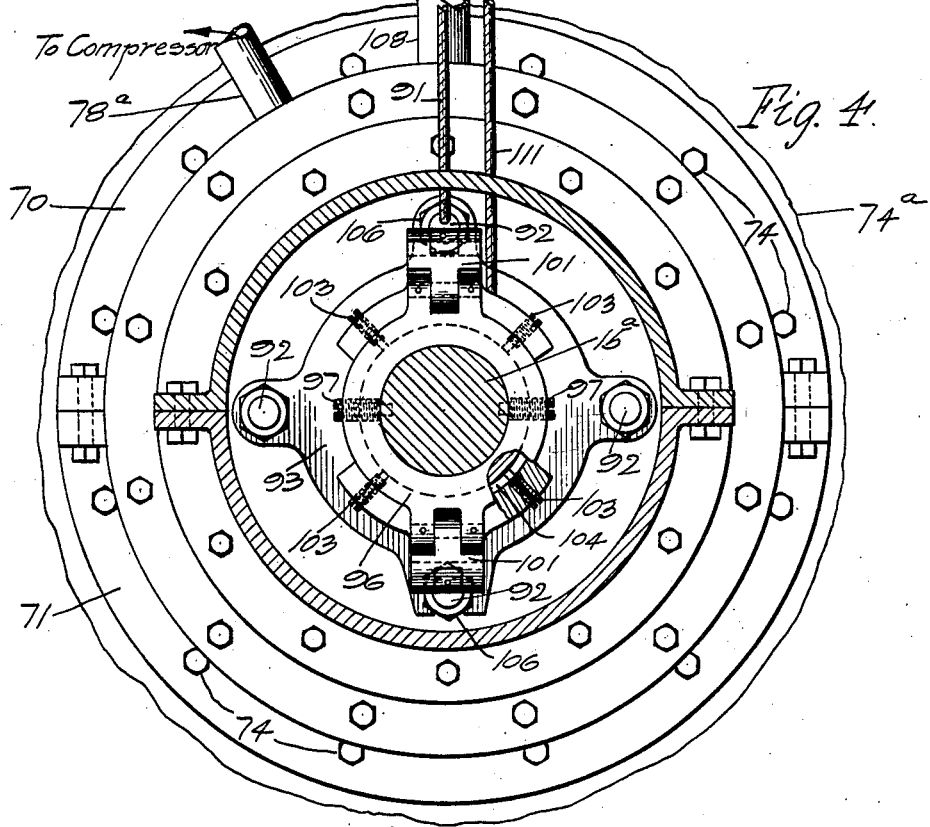

Patented Dec. 18, 1928.

1,695,320

UNITED STATES PATENT OFFICE.

WILLIS H. CARRIER, OF ESSEX FELLS, NEW JERSEY, ASSIGNOR TO CARRIER ENGINEERING CORPORATION, OF NEWARK, NEW JERSEY.

STUFFING BOX OR SEALING MEANS FOR COMPRESSORS AND THE LIKE.

Original application filed April 5, 1921, Serial No. 458,679. Divided and this application filed January 9, 1926. Serial No. 80,384.

This invention relates to stuffing boxes or sealing means for rotary or centrifugal gas compressors, vacuum pumps and the like, for providing a substantially frictionless, gas tight closure for the shaft opening through which the compressor shaft passes out of the compressor housing or casing. The invention is particularly desirable for use in connection with centrifugal compressors of refrigerating apparatus such as disclosed in my application Serial No. 458,679 for United States Patent, No. 1,575,818, dated March 9, 1926, of which this application is a division. The invention, however, is not restricted in its application to such use, but is applicable to elastic fluid compressors and the like for other purposes where it is important to seal the shaft opening against the leakage of gas or air therethrough, and to do this with the minimum friction.

The objects of my invention are to provide a stuffing box or sealing arrangement for compressors and the like that will be substantially frictionless notwithstanding the high speed of the rotary compressor, will seal perfectly against any necessary vacuum or against any moderate pressure up to atmospheric pressure or more while the machine is running, and will also effectually prevent any escape of the refrigerant vapor and any ingress of air when the rotation of the compressor is stopped; also to provide a practical stuffing box or sealing mechanism in which a liquid sealing medium effects a substantially frictionless closure when the compressor is running, and a valve or mechanical device forms the closure when the compressor is not running; also to prevent the sealing liquid of the stuffing box from leaking anywhere into the compressor, so as to preclude the mechanical trouble and contamination of the refrigerant which would otherwise result; and also to improve stuffing boxes or sealing devices in the other respects hereinafter described and set forth in the claims.

In the accompanying drawings:—

Fig. 1 is a sectional elevation of a stuffing box embodying my invention.

Figs. 2 and 3 are fragmentary sections thereof showing respectively the closed and open positions of the stuffing box valve.

Fig. 4 is a transverse sectional elevation thereof on line 4—4, Fig. 1.

Fig. 5 is a sectional plan view thereof on line 5—5, Fig. 7.

Fig. 6 is a vertical section thereof on line 6—6, Fig. 1.

Figure 7:
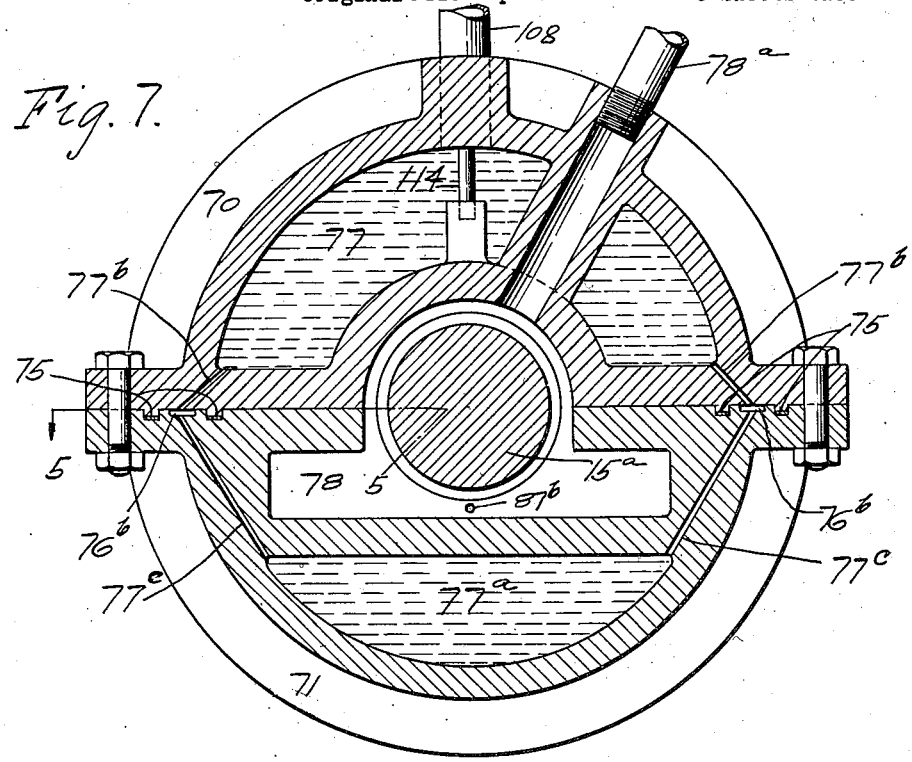
Fig. 7 is a vertical section thereof on line 7—7, Fig. 1.

The stuffing box is preferably constructed as follows: The stuffing box casing which surrounds the compressor shaft $15^a$ is preferably composed of separable halves or sections 70 and 71, each extending part way around the shaft, and an outer end plate or head 72 having a central opening through which the shaft passes. These parts or sections of the casing are bolted or otherwise tightly secured together and the casing is stationarily secured, as by bolts 74 to the pressure or discharge end $74^a$ of the casing of the compressor. Each of the joints between the parts of the stuffing box and between the stuffing box and the shell of the compressor is made gas tight, preferably by means of soft metal gaskets or packing strips 75 supplemented by a liquid seal. 76 represents a circular channel for the sealing liquid in the joint between the stuffing box and the compressor casing, and $76^a$ represents a similar sealing channel in the joint between the head 72 and the two half sections of the stuffing box. These channels are connected by sealing channels $76^b$, see Fig. 7, in the joints between the half sections 70 and 71 of the box, and sealing liquid is supplied to the channels from storage chambers 77 and $77^a$ in the stuffing box through suitable connecting ducts $77^b$ and $77^c$.

The stuffing box casing is provided with a vacuum chamber 78 surrounding the compressor shaft adjacent to the compressor casing, and this chamber is connected by a suitable pipe or conduit $78^a$ with the suction end of the compressor or with one of the intermediate compressor stages so that a vacuum is maintained in the chamber 78 for the purpose of preventing condensation of the refrigerant vapor in the stuffing box between the compressor and the liquid seal, about to be described.

The stuffing box is provided with an annular sealing chamber 79 surrounding the compressor shaft, and is also preferably provided on opposite sides of this sealing chamber with auxiliary annular chambers 80 and 81. Pressed on or otherwise fixed by a gas tight joint to the compressor shaft, is an impeller sleeve 82 provided with annular flanges 83 and 84 and impeller blades $83^a$ and $84^a$ which project respectively into and are adapted to rotate in the chambers 80 and 81, and between these impellers with an annular flange 85 which projects into the sealing chamber 79 and is provided on its opposite sides with impeller blades 86 and $86^a$ adapted to rotate in the sealing chamber. The impeller chamber 80 is connected to the sealing chamber 79 by one or more ducts 87 which extend inwardly from the outer portion of the chamber 80 and connect with the sealing chamber 79 between its ends, and the inner portion of the sealing chamber 79, at the opposite side of the sealing flange, is connected with the other impeller chamber 81 near its outer periphery by one or more ducts $81^a$. A duct $87^b$ connects the inner impeller chamber 80 with the vacuum chamber. Sealing liquid, which is supplied to the outer impeller chamber 81, as explained later, is pumped by the centrifugal action of the impellers in this chamber into the sealing chamber 79 and the impellers in the chamber 80 act to create a pressure which prevents the liquid from passing out of the sealing chamber into the chamber 80. A body of sealing liquid is thus held by centrifugal force in the outer peripheral portion of the sealing chamber 79, into which liquid projects the outer edge of the flange 85 in this chamber, thereby forming a liquid seal which prevents the passage of vapor or air through the shaft opening of the stuffing box either out of or into the compressor. The impellers in the chambers 80 and 81 at opposite sides of the sealing chamber supplement the impellers in the latter chamber in producing an effective liquid seal.

88 represents a valve or sleeve which surrounds the compressor shaft outwardly beyond the sleeve 82 and is adapted to slide lengthwise on the shaft into and out of contact with the end face of the sleeve 82. The adjacent ends of the valve 88 and the sleeve 82 are preferably of complementary frusto-conical shape so as to form a tight joint when the valve seats against the end of the sleeve. The end of the sleeve 82 acts by centrifugal force to impel sealing liquid which is delivered to the space between the valve and the sleeve 82, through a duct 89 into the outer impeller chamber 81. An annular groove 90 is formed between the adjacent ends of the valve 88 and sleeve 82, preferably in the inner end of the valve, and sealing liquid is supplied from a suitable reservoir through a pipe 91 and duct $91^a$ to this groove. The valve 88 is connected to the outer end of the stuffing box and held from turning, preferably by studs or bolts 92 which are screwed or otherwise suitably fixed to the head of the stuffing box and extend through perforated lugs on an outwardly projecting flange 93 on the valve. Springs 94 surrounding these bolts or studs between the lugs and the end of the stuffing box tend to open the valve or move it outwardly away from the end of the sleeve 82. 95 indicates an annular metal bellows or extensible sleeve which surrounds the adjacent ends of the sleeve 82, and the valve, and is tightly secured at its opposite ends to the outer end of the stuffing box and to the outwardly projecting flange 93 of the valve. This extensible sleeve forms a gas and liquid tight chamber around the adjacent ends of the valve 88 and sleeve 82, whereby the sealing liquid is confined and the loss of vacuum or the entrance of air prevented while, nevertheless, permitting the opening and closing of the valve. Absorbent material or wicking $95^a$ is preferably provided in the cavities of the expansible sleeve 95 so that the sealing liquid will be absorbed by this material and retained in the sleeve, thus largely preventing the liquid from running out of the sleeve when the compressor is stopped.

The valve is adapted to be moved outwardly or opened and retained open while the compressor is running, and closed when the rotation of the compressor stops by an operating mechanism in the nature of a centrifugal governor. This device comprises a ring 96 which is fixed to the compressor shaft by screws 97 or other suitable fastenings, and a movable ring 98 which is adapted to slide endwise on the shaft and is prevented from turning thereon preferably by means of a key or feather 99 working in a longitudinal groove 100 in the ring 98. The two rings 96 and 98 are connected by governor links 101 and 102 which are pivoted together at their adjacent ends, and at their outer ends are pivoted respectively to the fixed and sliding rings 96 and 98. The sliding ring 98 is provided with studs or fingers 103 which project into an annular groove 104 in the outer end of the valve sleeve 88 so that the valve is moved outwardly or inwardly by the corresponding movements of the ring 98. 105 indicates a coil spring surrounding the fixed and movable rings 96 and 98 and acting against shoulders thereon to press the movable ring 98 and the valve inwardly to close the valve. When the compressor is running, the centrifugal action of the governor links 101, 102 moves the ring 98 and the connected valve outwardly against the action of the closing spring 105. The small springs 94 surrounding the studs or bolts 92 are lighter than the valve closing spring 105 and do not prevent the valve from being closed by this spring when the compressor stops, but the springs 94 assist in opening the valve when starting up the compressor in case the valve sticks. The adjacent ends of the governor rings 96 and 98 are adapted to abut to limit the opening movement of the ring 98, and the opening movement of the valve 88 is limited by the engagement of its lugs with adjustable nuts or stops 106 on the studs 92. When the ring 98 and valve are thus arrested in their outer or open positions, there will be a clearance between the valve opening fingers 103 and the faces of the groove 104 into which they extend so that there will be no friction between these parts when the valve is open and the compressor is running.

107 represents the reservoir for supplying the sealing liquid to the stuffing box. The reservoir can be of any suitable type, but it is preferably supported on an upright tube 108 secured to the stuffing box and connecting the reservoir with the storage chamber 77 in the stuffing box so that the latter is filled through the reservoir and tube. The reservoir is preferably provided with a gage glass 109 and with a sight feed valve 110 in the discharge pipe 91 which leads to the seat of the valve 88, so that the feed of the sealing liquid can be observed and regulated as required. A separate discharge pipe 111 with a sight feed or regulating valve 112 delivers the sealing liquid to the bore of the valve sleeve 88 to lubricate this valve. The feed pipes are preferably flexible or constructed so as not to interfere with the movement of the valve 88. 113 represents a liquid return duct leading from the first impeller chamber 81 and connecting with a pipe 114, preferably extending up through the supporting tube 108 into the reservoir with its upper end above the high level of the liquid in the reservoir. Any surplus sealing liquid, above the quantity utilized in forming the liquid seal in the sealing chamber 79, is returned through the pipe 114 to the reservoir by the impeller or centrifugal pump in the first impeller chamber 81. In this way a continuous supply of the sealing liquid, more than ample to make the seal, is continuously circulated through the extensible liquid chamber surrounding the valve seat and the connecting impeller chamber 81. Any suitable sealing liquid, such as glycerine, water or oil can be used. When the compressor is stopped, the closing of the valve 88 automatically stops the discharge of the sealing liquid and prevents waste thereof or its leakage into the compressor. The groove 90 in the end of the valve is fed with the sealing liquid when the valve is closed and forms a liquid seal supplementing the valve.

Figure 8:
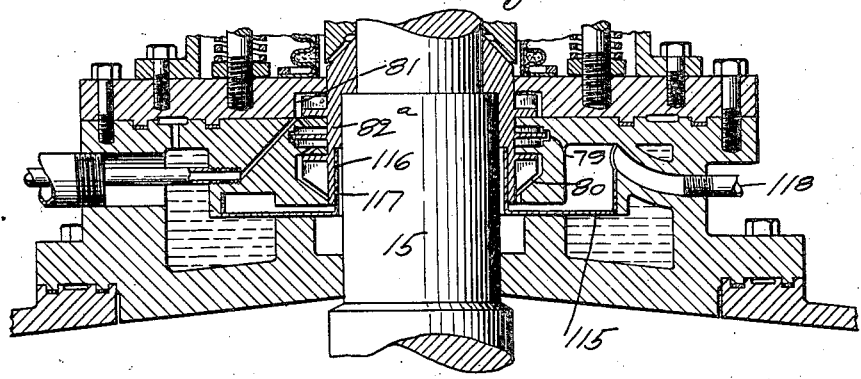
Fig 8 is a sectional elevation of the lower end of the stuffing box as changed for use on a vertical compressor.

When the stuffing box is placed vertically, an annular cup or chamber 115, see Fig. 8, is used, which surrounds the lower end of the impeller sleeve 82ª and has an inner tubular wall 116 which extends upwardly around the compressor shaft in an annular recess 117 in the impeller sleeve. When the compressor is stopped, the sealing liquid is adapted to run out of the impeller chambers 79, 80, and 81 and collect in this cup, which prevents the liquid from running into the compressor. This cup is connected by a pipe or passage 118 with the suction end of one of the compressor stages, and forms a vacuum chamber serving the same function as the vacuum chamber in the horizontally arranged stuffing box.

The stuffing box described provides a centrifugal liquid seal free from substantial friction when the compressor is running, and a valve or mechanical closure when the rotation of the compressor stops, and always insures a gas tight closure of the opening for the compression shaft. This stuffing box is applicable to high speed rotary compressors, vacuum pumps or other rotary machines where it is necessary to prevent all leakage, either inwardly or outwardly around the machine shaft, and prevent friction.

I claim as my invention:—

1. The combination with a fluid compressor having a rotary shaft extending through an opening in the compressor casing, of a valve and valve seat which surround said shaft and cooperate when the valve is seated to form a closure for said shaft opening, mechanism for holding said valve and valve seat out of contact when the compressor is running, and an impeller which rotates with said shaft and maintains a circulation of sealing liquid between said valve and valve seat and forms a liquid seal for said shaft opening when the compressor is running.

2. The combination with a fluid compressor having a rotary shaft extending through an opening in the compressor casing, of a valve and valve seat which surround said shaft and cooperate when the valve is seated to form a closure for said shaft opening, mechanism for holding said valve and valve seat out of contact when the compressor is running, a sealing chamber surrounding said shaft, an impeller which rotates with said shaft in said sealing chamber, and supply and return connections for sealing liquid to and from said sealing chamber, whereby said impeller maintains a centrifugal liquid seal for said shaft opening when the compressor is running.

3. The combination with a fluid compressor having a rotary shaft extending through an opening in the compressor casing, of a valve and valve seat which surround said shaft and cooperate when the valve is seated to form a closure for said shaft opening, mechanism for holding said valve and valve seat out of contact when the compressor is running, a reservoir for a sealing liquid, a sealing chamber surrounding said shaft, an impeller which rotates with said shaft in said sealing chamber, and supply and return connections between said reservoir and sealing chamber, whereby said impeller maintains a centrifugal liquid seal for said shaft opening when the compressor is running.

4. The combination with a fluid compressor having a rotary shaft extending through an opening in the compressor casing, of a valve and valve seat which surround said shaft and cooperate when the valve is seated to form a closure for said shaft opening, mechanism for holding said valve and valve seat out of contact when the compressor is running, a sealing chamber surrounding said shaft, an impeller which rotates with said shaft in said sealing chamber, a connection for supplying sealing liquid to the space between the valve and valve seat, and a liquid return connection from said sealing chamber whereby the impeller maintains a circulation of sealing liquid between the valve and valve seat and forms a liquid seal for the shaft opening when the compressor is running.

5. The combination with a fluid compressor having a rotary shaft extending through an opening in the compressor casing, of a valve and valve seat which surround said shaft and cooperate when the valve is seated to form a closure for said shaft opening, centrifugal mechanism for holding said valve and valve seat out of contact when the compressor is running, and means which maintain a circulation of sealing liquid between said valve and valve seat and form a liquid seal for said shaft opening when the compressor is running.

6. The combination with a fluid compressor having a rotary shaft extending through an opening in the compressor casing, of a valve and valve seat which surround said shaft and cooperate when the valve is seated to form a closure for said shaft opening, operating mechanism for holding said valve out of contact with said valve seat when the compressor is running, said valve and operating mechanism being relatively movable, a stop device for relieving friction between said operating mechanism and said valve when the valve is unseated, and means which maintain a liquid seal for said shaft opening when the compressor is running.

7. The combination with a gaseous fluid compressor having a rotary shaft extending through an opening in the compressor casing, of a valve and valve seat which cooperate when the valve is seated to form a closure for said shaft opening, mechanism which operates to hold the valve and valve seat out of contact when the compressor is running, a sealing chamber surrounding said shaft, a source of supply for sealing liquid and supply and return connections between the same and said sealing chamber, and means operating when the compressor is running to maintain a liquid seal for said shaft opening in said sealing chamber.

8. The combination with a gaseous fluid compressor having a rotary shaft extending through an opening in the compressor casing, of a valve and valve seat which cooperate when the valve is seated to form a closure for said shaft opening, and means operating when the compressor is running to provide a liquid seal for said shaft opening, there being a space surrounding said shaft between the compressor and said liquid seal, said space communicating with a low pressure part of the compressor whereby a partial vacuum is maintained by said space to prevent condensation therein of the fluid being compressed.

9. The combination with a gaseous fluid compressor having a rotary shaft extending through an opening in the compressor casing, a sealing chamber surrounding said shaft, and means for circulating a sealing liquid through and maintaining a liquid seal in said chamber, there being a space surrounding said shaft between the compressor and said sealing chamber, said space communicating with said sealing chamber and with a low pressure part of the compressor whereby a partial vacuum is maintained in said space to prevent condensation therein of the fluid being compressed.

10. The combination with a fluid compressor having a rotary shaft extending through an opening in the compressor casing, of a valve and valve seat which surround said shaft and cooperate when the valve is seated to form a closure for said shaft opening, mechanism for holding said valve and valve seat out of contact when the compressor is running, a sealing chamber surrounding said shaft, an impeller which rotates with said shaft in said sealing chamber, impeller chambers at opposite sides of said sealing chamber and communicating therewith, impellers which rotate in said impeller chambers for moving sealing liquid from said impeller chambers to said sealing chamber, a sealing liquid supply communicating with one of said impeller chambers, and a liquid return connection communicating with said sealing chamber.

WILLIS H. CARRIER.